(12) United States Patent
Makagon et al.

(10) Patent No.: US 9,077,803 B2
(45) Date of Patent: *Jul. 7, 2015

(54) SYSTEM FOR FACILITATING LOOSELY CONFIGURED SERVICE WORKER GROUPS IN A DYNAMIC CALL CENTER ENVIRONMENT

(71) Applicant: Genesys Telecommunications Laboratories, Inc., Daly City, CA (US)

(72) Inventors: Petr Makagon, San Francisco, CA (US); Herbert Willi Artur Ristock, Walnut Creek, CA (US); Dan Kikinis, Saratoga, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,643

(22) Filed: Jan. 22, 2014

(65) Prior Publication Data

US 2014/0205078 A1    Jul. 24, 2014

Related U.S. Application Data

(63) Continuation of application No. 11/966,854, filed on Dec. 28, 2007, now Pat. No. 8,666,056.

(51) Int. Cl.
*H04M 3/00* (2006.01)
*H04M 5/00* (2006.01)
(Continued)

(52) U.S. Cl.
CPC ......... *H04M 3/5175* (2013.01); *G06Q 10/0631* (2013.01); *H04M 3/5125* (2013.01); *H04M 3/5191* (2013.01)

(58) Field of Classification Search
CPC ... H04M 3/51; H04M 3/5166; H04M 3/5175; H04M 3/5183; H04M 3/523; H04M 3/5232; H04M 5/5233; H04M 5/5237; H04M 3/5238; H04M 2203/2061; H04M 2242/12; G06Q 10/06

USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1

See application file for complete search history.

(56) References Cited

U.S. PATENT DOCUMENTS 6,636,590 B1 * 10/2003 Jacob et al. .............. 379/114.05
7,889,857 B2    2/2011 Grass et al.
(Continued)

FOREIGN PATENT DOCUMENTS

WO    WO 2009/086340 A2    7/2009

OTHER PUBLICATIONS

Office action for Chinese patent application No. 200880123031.9 mailed by the State Intellectual Property Office of the PRC on Feb. 17, 2014, with English translation, 13 pages.

(Continued)

*Primary Examiner* — Khai N Nguyen
(74) *Attorney, Agent, or Firm* — Christie, Parker & Hale, LLP (57) ABSTRACT

A system for soliciting and activating one or more groups of workers to service contact center business includes an interface accessible to the one or more groups for accepting group registration data, publishing contact center business and for enabling the groups to subscribe to receive business; a data repository for storing the registration data for subscribing groups; and a routing server for specifying routing strategies for event routing to the groups. The system is characterized in that the one or more groups of workers may be activated during contact center business activity to perform services based on need.

17 Claims, 6 Drawing Sheets

(51) Int. Cl.
*H04M 3/51* (2006.01)
*G06Q 10/06* (2012.01)

(56) References Cited

U.S. PATENT DOCUMENTS

| | | | |
|---|---|---|---|
| 8,666,056 B2* | 3/2014 | Makagon et al. | 379/265.09 |
| 2002/0052773 A1* | 5/2002 | Kraemer et al. | 705/9 |
| 2002/0069081 A1* | 6/2002 | Ingram et al. | 705/1 |
| 2002/0072946 A1* | 6/2002 | Richardson | 705/8 |
| 2003/0110228 A1 | 6/2003 | Xu et al. | |
| 2005/0100160 A1 | 5/2005 | Bae | |
| 2005/0165930 A1* | 7/2005 | Whitman | 709/226 |
| 2005/0182639 A1* | 8/2005 | Dale | 705/1 |
| 2005/0257235 A1* | 11/2005 | Lin | 725/1 |
| 2007/0162323 A1* | 7/2007 | Gorham | 705/9 |
| 2009/0168990 A1 | 7/2009 | Makagon et al. | |
| 2014/0205078 A1* | 7/2014 | Makagon et al. | 379/265.05 |

OTHER PUBLICATIONS

International Preliminary Report on Patentability with Written Opinion of the International Searching Authority, for International application No. PCT/US2008/088094, dated Apr. 19, 2011, 4 pages.
European Patent Office Communication pursuant to Rules 161(2) and 162 EPC, dated Jun. 20, 2011, for EP Application No. 08867071.6, 3 pages.
European Patent Office Communication pursuant to Article 94(3) EPC, for EP Application No. 08867071.6, dated Sep. 24, 2012, 6 pages.
European Patent Office Communication pursuant to Article 94(3) EPC, dated Oct. 31, 2013, for EP Application No. 08867071.6, 6 pages.
Office action for Chinese Patent Application 200881230 31.9 issued on May 28, 2013 with English Translation, 11 pages.
Chinese Office action for Application No. 200880123031.9, dated Sep. 15, 2014, 4 pages.

* cited by examiner

Fig. 1

Virtual Team Registration

Group or Team Name

Number of Workers

Enter Worker Names

Voice Routing Point Number

Enter Team Qualifications/Skills

Enter Certification Data/Numbers

Available Media Channels

Voice
- VoIP
- Cell
- Land Line

Messaging
- Email
- IM
- SMS
- SIP

Create Team Log-in

User Name

Password

Submit Form

Individual Registration (dynamic teams)

301

Name [            ]

Enter Personal Qualifications/Skills

[                    ]

Enter Certification Data/Numbers

[                    ]

Enter Contact Information

[                    ]

Available Media Channels

Voice
VoIP ☐
Cell ☐
Land Line ☐

Messaging
Email ☐
IM ☐
SMS ☐
SIP ☐

Create Personal Log-in    User Name [            ]
                          Password  [            ]

[ Submit Form ]

| Welcome | Contact Center XYZ activity page | | |
|---|---|---|---|
| Channels | Activity Description | Product | Duration |
| Inbound Telephone/Chat | Live Tech Service: Answer technical questions on set up and configuration/ trouble shoot [Subscribe to this Opportunity] | MS-X\TV SYS | 24/7 In Progress |
| Outbound Telephone Customer Care | Automated outbound attendant Customer Opt-in for live offer to upgrade [Subscribe to this Opportunity] | Premiere Programming | Today Start 3:00PM End 9:00 PM Upcoming |
| Live Outbound Telephone Cold Calling | Live outbound cold calls from provided customer list/script provided for offering entertainment service package [Subscribe to this Opportunity] | MS-X\TV SYS\Service Spec Offer | 5:00PM 8:30PM Daily Upcoming |
| Outbound Telephone Customer Care | Automated outbound attendant Customer Opt-in for Customer Care Survey Approximately 6 minutes [Subscribe to this Opportunity] | MS-X\TV SYS\Service Installation | Tomorrow Start 9:00AM End 9:00 PM Upcoming |

SYSTEM FOR FACILITATING LOOSELY CONFIGURED SERVICE WORKER GROUPS IN A DYNAMIC CALL CENTER ENVIRONMENT

CROSS-REFERENCE TO RELATED APPLICATIONS

This application is a continuation of U.S. patent application Ser. No. 11/966,854, filed on Dec. 28, 2007, now U.S. Pat. No. 8,666,056, the disclosure of which is hereby incorporated by reference in its entirety.

BACKGROUND OF THE INVENTION

1. Field of the Invention

The present invention is in the field of telephony communications contact services and pertains particularly to a system and methods for soliciting and activating remote service workers to service contact center business.

2. Discussion of the State of the Art

In the field of telephony contact servicing, call centers are employed to handle various types of customer care and servicing. State-of-the-art call centers are more appropriately termed multimedia contact centers because many centers are now digital media service centers employing data network telephony (DNT) technologies, Web services, short message services (SMS) chat, instant messaging, video conferencing, email, e-fax, and so on.

Multimedia contact centers employ service agents who individually or as part of an agent group service customers of one or more enterprises. In-house agents typically are connected to a configuration server via a local area network (LAN) and are tracked when they are logged in to the system so that their activities are monitored. Agents typically operate at agent stations and employ laptops or desktop systems, IP telephones, plain old telephony service (POTS) telephones, personal digital assistants (PDAs), paging systems and other types of communications devices when servicing clients.

Depending on the flexibility of a service center, agents may be configured dynamically into virtual agent groups where, within groups, agents may be monitored for state of activity. Agents may be dynamically re-configured into other groups depending on the needs of the service center.

Although workflow engines and dynamic resource allocation are available within a state-of-art service center, there may be times during business activity when there is a lot of traffic and time-to-answer (TTA) for any one group of agents is running very high. At peak periods there may be significant estimated wait time (EWT) for an agent resulting in high customer frustration, which in turn can lead to call abandonment, lost service opportunities and other problems.

Some enterprises utilize third-party contact services that may kick in during peak periods or at planned intervals to help lessen the load on enterprise agents, reduce wait time and improve service objectives overall. Professional third-party services can be expensive and can be difficult to manage in turns of unifying service level objectives, managing incoming call loads and so on.

It has occurred to the inventors that there are many individuals who may have sufficient skills and other qualifications to act a customer service representatives or technical representatives in a variety of fields for an enterprise with little or no training requirements. Many of these potential resources are not currently utilizing those skills for one reason or another. It has also occurred to the inventors that with the general advances made in communications technology, many of these individuals and ad hoc groups of skilled persons possess adequate communications equipment and have access to high-bandwidth infrastructure and networks.

Therefore, what is needed in the art is a system and methods for making use of loosely configured groups of remote workers to service enterprise customers at least during times of need for the enterprise. A system such as this could save time and expense for an enterprise and provide opportunity to those who have certain skills.

SUMMARY OF THE INVENTION

The problem stated above is that third-party contract services for enterprises may be expensive and difficult to manage effectively in terms of service level objective (SLO) unification or conformance. The inventors therefore considered the functional elements of a contact center service, looking for elements that could support flexibility in acquiring and managing contact service groups in a way that could be executed according to need.

Every enterprise relies on good quality customer service to be successful in today's fast-paced environment. Most such enterprises maintain some call center capability in-house and may outsource for additional services that may be used if needed.

The present inventors realized in an inventive moment that if, during the time of need for additional contact services, qualified resources could be quickly reserved and activated to help with customer servicing, significant improvement in service quality might result. The inventor therefore constructed a unique resource acquisition system for extending services of a contact center that allowed customers to be serviced more rapidly and that proved to be less expensive and more efficient than hiring professional third party services.

Accordingly, a system for soliciting and activating one or more groups of workers to service contact center business is provided. The system includes an interface accessible to the one or more groups for accepting group registration data, publishing contact center business and for enabling the groups to subscribe to receive business; a data repository for storing the registration data for subscribing groups; and a routing server for specifying routing strategies for event routing to the groups. The system is characterized in that the one or more groups of workers may be activated during contact center business activity to perform services based on need.

According to one aspect of the invention, a system for assembling a virtual service group from a pool of service workers and activating the group for servicing contact center business is provided. The system includes an interface accessible to the remote service workers for publishing contact center business and for enabling the workers to subscribe to receive service events; a data repository for storing current information about subscribing service workers; a server for aggregating the subscription information of more than one service worker subscribing to a same piece of contact center business; and a routing server for routing service events to the assembled worker group.

According to a further aspect of the invention, a method for acquisitioning contact center resources to service contact center business is provided and includes the steps (a) accepting registration information from potential contact center resources and presenting for subscription one or more service opportunities to the registrants; (b) receiving and validating subscription requests relative to the one or more service opportunities; (c) reserving validated subscribers for potential activation during occurrence of one or more service opportunities; and (d) activating those subscribers in reserve to perform services according to need.

According to a further aspect of the invention a method for dynamic aggregation of a number of contact service workers identified by registration data into a contact center resource group is provided and includes steps (a) presenting for subscription one or more service opportunities to the registrants; (b) receiving and validating subscription requests relative to the one or more service opportunities; (c) at or before the start of a service opportunity, aggregating required data about the registrants subscribing to and validated to work the service opportunity; (d) notifying the involved subscribers of their assignments relative to the opportunity; and (e) establishing a shared routing point, interface, or bridge for use by the group for interfacing with customers.

DETAILED DESCRIPTION

The inventors provide a unique system and methods for soliciting worker groups and/or individual workers and for utilizing those workers to perform some contact services. The system and methods are described in detail in the following examples.

Figure 1:
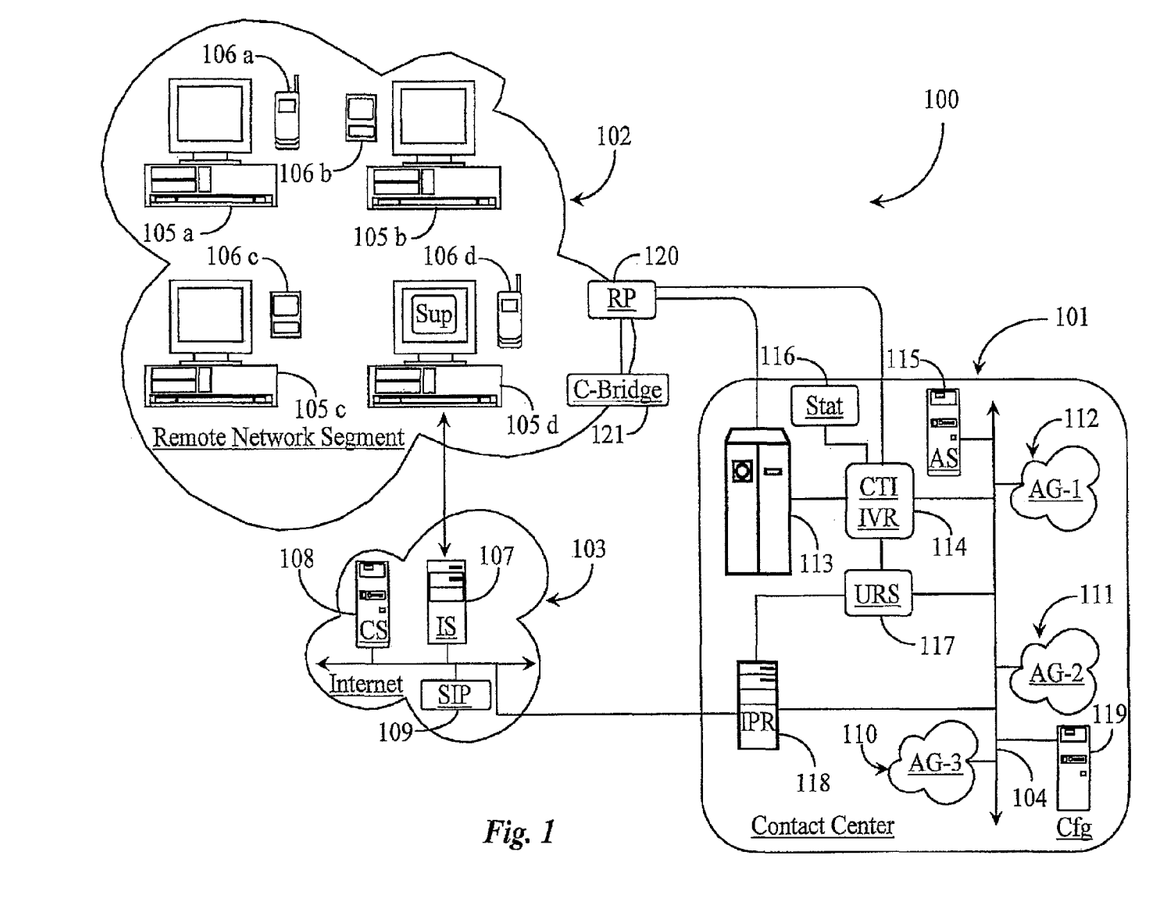
FIG. 1 is an overview of a communications network supporting remote worker service contracting according to an embodiment of the invention.

FIG. 1 is an overview of a communications network 100 supporting remote worker service contracting according to an embodiment of the invention. Communications network 100 includes a contact service center 101, hereinafter termed contact center or just center 101. Center 101 is a state-of-art contact center providing contact services for one or more than one enterprise. In one embodiment, center 101 is hosted by a single enterprise. I another embodiment, center 101 is a third-party service contracted by one or more than one enterprise.

Center 101 includes a local area network (LAN) 104 for agent connectivity and communications and system support. LAN 104 is adapted for IP communication and other Internet network protocols. Contact center 101 includes a telephone switch 113, which may be a private branch exchange (PBX), an automated call distributor (ACD), or some other local telephone switching apparatus capable of processing incoming and outgoing telephone calls. Switch 113 is computer telephony integrated (CTI) by a CTI server 114 connected thereto by a CTI link. CTI server 114 also represents interactive voice response (IVR) technology and may also be referred to as an IVR or CTI/IVR 114.

CTI/IVR 114 is connected to LAN 104 and has LAN access to an application server (AS) 115 connected to LAN 104. Application server 115 contains and serves all contact center service applications that may be executed during normal contact center business activity. These applications may include but are not limited to customer information system (CIS) applications, Voice customer interfacing applications, workflow assignment applications, agent scripting applications, and other typical communication center applications that may be used in the course of business.

Contact center 101 includes an Internet Protocol Router (IPR) 118 connected to LAN 104 for event-to-agent routing purposes and to an Internet network 103. Customers contacting center 101 may originate in a telephone network or the Internet network or any connected sub-networks. Contact center 101 utilizes agent groups to perform certain contact services. Agent groups include agent group 110, agent group 111, and agent group 112. Agent groups 110-112 comprise a plurality of individual agents given group assignments and specific duties within center 101. Group assignments may be based in part on the type of activity the group will perform well as the skills of the agents within a group. Group 110 may be servicing an outbound call campaign. Group 111 may be assigned to handle incoming calls. Group 112 may be assigned to live chat technical assistance. Group assignments are dynamic and temporary and may be based on any contact center need at the time. Groups may be re-designated; agents within a group may be re-assigned to other groups and so on.

Contact center 101 also includes a universal routing server (URS) 117 connected to CTI/IVR 114, to LAN 104, and to IPR 118. URS 117 executes internal routing strategies for routing events to agent groups 110-112 in this example. A statistics (Stat) server 116 is provided within center 101 and is connected to CTI/IVR 114. Stat server 116 provides current contact center statistics to clients of the server. Therefore, routing strategies may be based in part on center statistics including agent state, call state, and other useable contact center statistics.

Contact center 101 includes a configuration (Cfg) server 119 adapted to maintain the configurable states in the center such as the states and assignments of agents in groups 110-112. Agents within center 101 may login to the system through server 119 to be considered active in the center. Agents may receive their assignments through server 119 when they log in to the system. In this way agents are monitored and tracked and can be utilized to maximum benefit of the center. Center 101 may also employ remote service agents (not illustrated) that may also be required to log-in to the system through Cfg server 119 to be considered active.

In this example, center 101 maintains an Interfacing Web Server (IS) 107 connected to Internet network 103. Server 107 may be adapted as a multi-purpose Web interface for customers accessing services via the Web. In this example, IS 107 is also adapted as an interfacing server to potential remote service worker groups that may register with the center and subscribe to center business on a contract. In this example, center 101 hosts an Internet chat server (CS) 108 and a session initiation protocol (SIP) server 109 for facilitating SIP-based communications.

A remote network segment 102 is illustrated in this example. Network segment 102 may be a LAN, a wireless network, a virtual private network, or some other sub-network connected to Internet network 103. In this example, network 102 comprises a group of remote service workers operating at remote computer stations 105 *a*, 105 *b*, 105 *c*, and 105 *d*. Computer stations 105 may be laptop or desktop computers or a mix of those. Stations 105 (*a-d*) may be connected wirelessly as a named wireless network. Other communications equipment illustrated as part of network segment 102 include a cell phone 106 *a* associated with station 105 *a*; a cell phone 106 *d* associated with station 105 *d*; a personal digital assistant (PDA) 106 *b* associated with station 105 *b*; and a PDA 106 *c* associated with station 105 *c*. Other communications equipment may be present within network segment 102 without departing from the spirit and scope of the present invention.

Remote workers operating stations 105 (*a-d*) may be a loosely connected and organized group of individuals that possess one or more common skill sets useful to contact center 101 such as certification as computer technicians for a particular operating system for example. Their state of domain organization may vary. In one embodiment, they may maintain an office and work together on a LAN. In one embodiment, they may live in a same general area and may network with each other over the Internet network using a VPN or some collaboration software. They may be individuals that aggregate socially at a popular WiFi location. Whatever the association or organization center 101 views the group as a possible resource that may be utilized when and if a need arises at the center for additional resources.

IS 107 serves a registration page that allows a group of remote service workers to register with the center and a business opportunity page enabling the group to subscribe to certain center business that the group is qualified to handle. In one embodiment, center 101 may provide some technical assistance and perhaps even some remote training to a worker group. In this example, station 105 *d* is designated as a supervisor station or group administrator station allowing the operator to make executive decisions on behalf of the group as a whole like browsing center business and committing the group to a service task by subscribing the group to the task.

In one embodiment, contact center applications may be provided in light version to the group supervisor who can distribute those applications to each of the member stations as required. These applications may include desktop communication applications for VoIP sessions, chat software, agent routing software, agent redirect tables, reporting applications, agent scripting applications, and the like. Moreover, support documents, technical specifications, procedural manuals, and other materials can be distributed to worker stations 105 (*a-d*) through IS 107. In this way, a loosely organized group can operate more professionally using some of the same tools available to in-house agents.

In one embodiment, it is important to keep track of and monitor the activity conducted by a group of remote service workers. It may be critical to the center to be able to obtain certain call handling statistics like session results, call abandonment rate, time to answer and so on in the way in-house agent statistics are gathered. If the center does not require remote groups to login as agents to a configuration server, the center may have to leverage other ways to monitor progress of the remote group. A remote group may not share a same infrastructure such as a local telephone switch or an IP router. In this example, center 101 provides a temporary routing point (RP) 120 from which the remote service workers may pick up their calls. Such a routing point may be provided in a local telephone switch, which the remote workers may take telephone calls from. Routing point 120 may be established on one of the networked computer stations like station 105 *d*. If the group equipment includes a router or switch, the routing point may be established in the group's router or switch. In this example, routing point 120 is controlled by CTI/IVR server 114 for call routing control. Telephone calls incoming to center 101 at switch 113 may be re-routed to RP 120 according to CTI control routines.

RP activity reports may be fed back to center 101 over the CTI link to CTI/IVR 114 and stat server 116 may generate useable statistics from the reported data. Center 101 may also provide a soft conferencing bridge (C-Bridge) 121 for agents to handle voice sessions through. Conference bridge 121 may be SIP enabled and may be used to connect remote workers operating at stations 105 *a-d* to enterprise customers. In this case, call handling statistics reporting, limited service worker state statistics reporting and call recording may be conducted. In one embodiment, data about the performance and activities of the group while servicing enterprise clients may be forwarded back to center 101 via CTI link to CTI/IVR, or from contact center applications installed on worker stations 105 (*a-d*) through station 105 *d* and IS 107 onto LAN 104 to any connected client that uses the information.

In one embodiment of the present invention, center 101 may provide a software contact center application that can be used to set up one of stations 105 (*a-d*) as a routing point that can rout events to the other stations and that can route voice calls to the associated PDAs 106 (*b,c*) and to cell phones 106 (*a,d*) via Bluetooth or other wireless connection technology. There are many existing methods for enabling monitoring of the performance of the remote service workers group from the perspective of center 101. Moreover the exact reliance on group monitoring depends on the desires of the center. In one embodiment the groups are minimally monitored for availability or presence for routing purposes.

In practice of the present invention, one or more service worker groups may register with contact center 101 to perform services for the center. These groups may be selected according to need and put into service by the center. Groups may subscribe to live incoming and outbound call campaigns or to other tasks such as email, chat, and messaging correspondence. Center 101 may reserve the right to validate and manage group credentials and may deny subscription requests to certain groups based on qualification. Once activated for service, there may be many independent groups servicing enterprise customers at any given time. Such groups may be activated at times of need such as when there is too much traffic for in-house agents to efficiently handle. The active groups may be alerted before activation and may be notified at the end of their service period and may be deactivated if they are no longer needed by the center.

Figure 2:
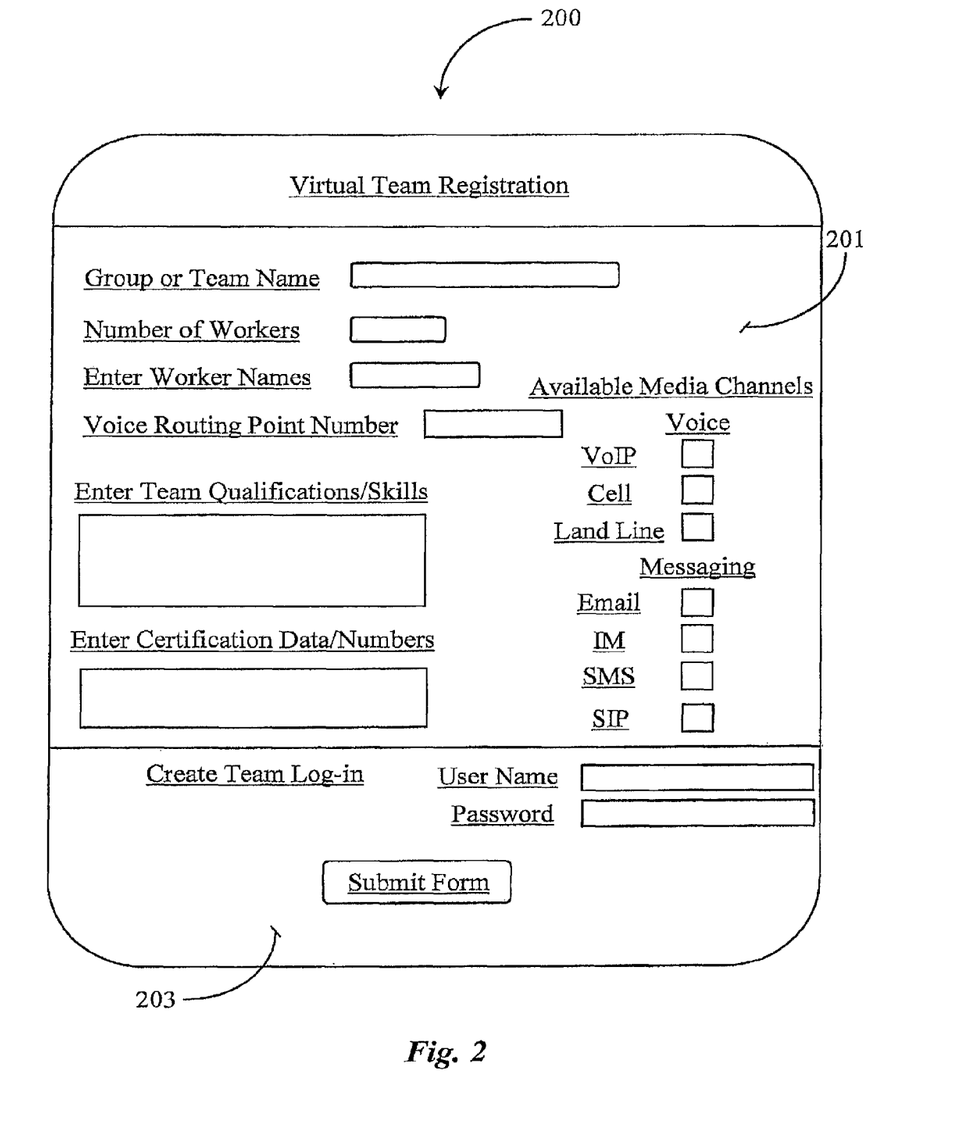
FIG. 2 is an exemplary screen shot of a team registration interface for registering a group of workers to perform services.

FIG. 2 is an exemplary screen shot of a team registration interface 200 for registering a group of workers to perform services. Interface 200 may be served to a group administrator or supervisor that is acting on behalf of the entire group. A typical group may be relatively small such as 10 or fewer workers but may include more workers in some cases. Interface 200 may be accessed through interface server 107 described above.

Team registration interface 200 has a workspace 201 in which several fields are presented for submitting information. Reading generally from top down, the fields include a field for entering the group or team name. This can be any moniker of the group, perhaps the name of a wireless or wired network the group uses to communicate. A field is provided for entering the number of service workers in the group. A next field is provided for entering the names of each group or team member.

A field is provided for entering a voice routing point number that can either be pre-entered if a routing point already exists for the group, or the center can provide the number if it is to provide the routing point. The same thing may be true of a conference bridge for bridging calls between customers and service workers.

A larger field is provided for entering the team qualification/skills that the team is relying on to obtain business from the center. Qualifications may include certificates in certain technologies, past contact center experience, past technical experience with certain products and services, installation and set up skills relative to certain products and systems, special language skills, and so on. Different group members may have different qualifications or skills that may have an effect on which tasks those individual members will receive from the center. For example, if four service workers make up a team and all are certified computer technicians but only two speak Spanish then the Spanish speaking workers would receive events from Spanish speaking customers. In a particular technical service environment, two workers may be skilled with hardware connection and installation while the other two workers are expert with set-up and programming. Events could be routed to the service workers (agent level routing) accordingly, or they could all subscribe to a common queue wherein the events are labeled as help with "hardware and installation" or help with "set-up and programming". In that case the workers could pick up calls that apply to them from a common queue or routing point.

A field may be provided for entering certificate names, issuing entities, renewal information and dates issued for any formal certifications that workers may possess. This information may include some obscure certifications like a certificate for graduating a class in blueprint reading for example. Although general in nature, the skill may be useful in certain situations like technical support with product assembly. Any new qualifications or skills that the team acquires may be updated to the center. Likewise, any skills lost by the team, such as due to a member leaving, should also be reported to the center. The center manages and maintains current skills qualification data on each group. The center may even encourage groups to keep skills honed and may suggest or provide materials, resources and other forms of support for the group to acquire new skills or to attain a higher rating in existing skills. Some center operators may in fact choose to operate dedicated web sites or paid TV stations for delivering training modules and certification examinations in order to build up an inventory of qualified "casual workers" who can assist in providing customer service to the center's customer base without having to employ additional dedicated center employees.

Workspace 201 contains check boxes for a group supervisor or administrator to indicate which of a number of media channels are available to access the group. Under Voice options there is listed VoIP, Cell, and Land Line. Under messaging, there are choices for Email, IM, SMS, and SIP (device SIP enabled?). Double clicking on each selected media channel may spawn a contact information page where the administrator can enter the device type, telephone number, email address, cell number, etc. for each service worker. Depending on the routing scheme used, personal cell numbers of service workers may become part of center routing destination information instead of a common routing point.

If a common routing point is used, it may be enabled to distribute events to each team member using those member's specific devices and device telephone numbers and/or messaging addresses. In this case, the specific contact information other than router points of a group may not be required at the center. Service worker level routing within the group may be performed at the routing point using a contact center routing strategy.

Interface 200 has a login information pane 203 wherein a supervisor or administrator may create and submit log-in information for the group to use later to subscribe to offered opportunities. Pane 203 is labeled create team log-in. In this example, the administrator creates a user name for the team and a password as an authentication pair authenticating the team to the interfacing server. An action button is provided for submitting the form. Registration interface 200 may appear differently than what is illustrated in this example without departing from the spirit and scope of the present invention. For example, interface 200 may be provided in the form of a browser window that includes all of the usual browser-nested functions. In this case it is a simple HTML Web form that is populated online and then submitted for validation.

Center 101 may take some time in order to validate some or all of the information provided through registration interface 200. The center may send an email with information to the team administrator indicating that the registration request is being considered and to look for a further email containing acceptance or denial information. A registration attempt may be denied, for example, if validation uncovers misinformation in the request or simply if the specified skills and qualifications are not needed at the time.

Center 101 may validate skills and qualifications, and may approve the registration request allowing the team administrator to go online and log-in using the team name and password to an opportunity server and browse the contact centers current and upcoming business requirements. The group may subscribe to any of the listed activities and may be notified of which activities the group might be selected for activation, activation meaning that events or other business will be routed to the group during the scheduled opportunity.

Figure 3:
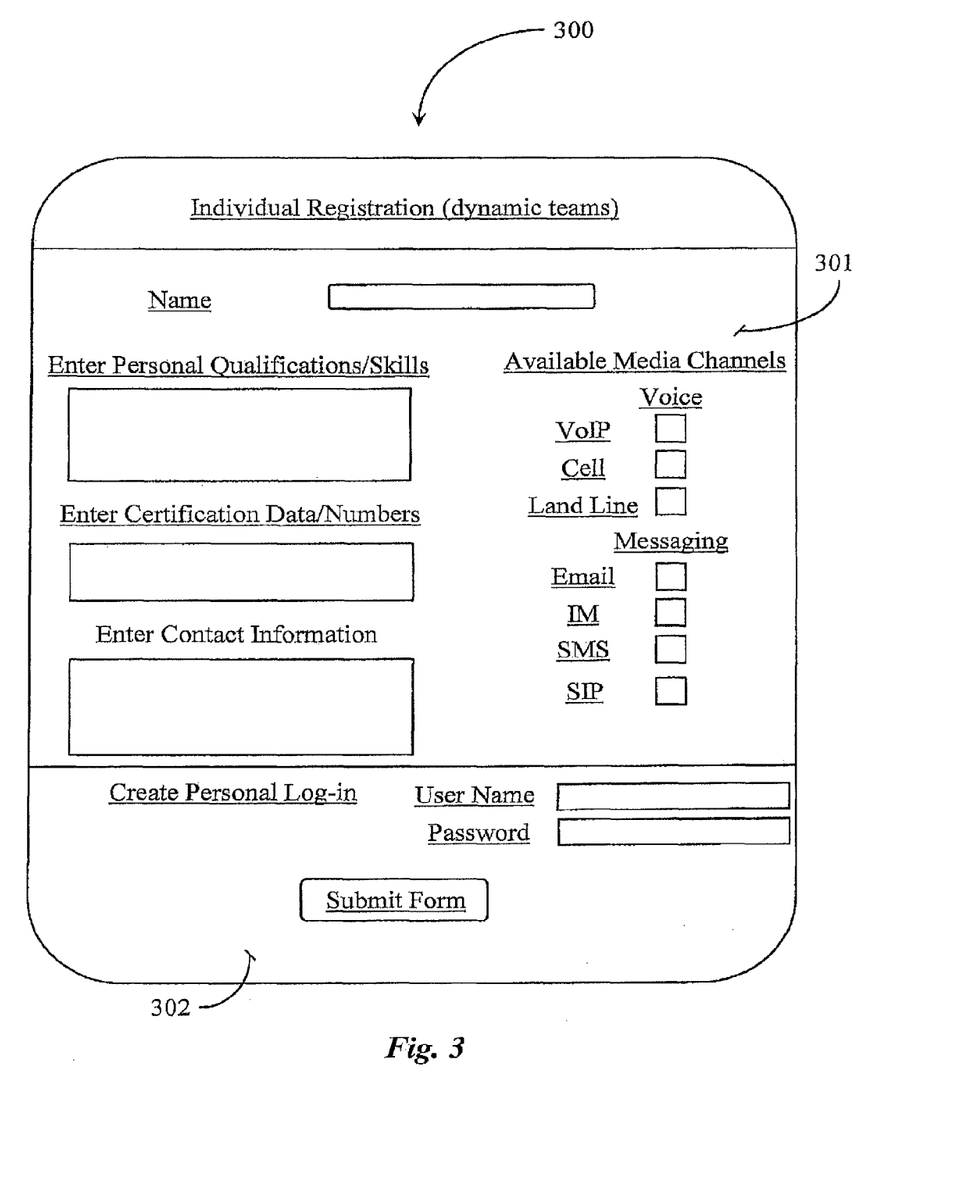
FIG. 3 is an exemplary screen shot of an individual registration interface for registering an individual worker to perform services.

FIG. 3 is an exemplary interactive display 300 of an individual registration interface for registering an individual worker to perform services. In one embodiment of the present invention, the center may not be limited to soliciting established groups of individuals but may also or instead solicit individuals that may be assigned a group to work in according to the skills and qualifications of the individual. In this case, three or more individuals having a similar skill set and qualification level may be assembled dynamically into a remote service worker group using some of the same technologies described further above.

An individual like a team member would have a computing station and a telephone and would be expected to have access to a communications network like the Internet and perhaps to be able to communicate in an uninterrupted fashion using chat, VoIP, cell, email, IM, SMS, etc.

Interface 300 may be served as an HTML Web form by IS 107 described further above. Interface 300 includes a workspace 301 for the individual to enter information for registration purposes. Reading from the top down, a first field is provided for the individual to enter a name. A next field is provided for the individual to enter personal qualification/skills that might be considered by the center. A next field is provided for the individual to enter formal certificate data, numbers, issue dates, expiration dates, issuing entities, and so on. A field may be provided for the individual to enter contact information such as main telephone, address information, work information, cell number, etc.

Like foam 200 described above, form 300 for individual registration has a section for indicating the available channels through which the individual may be contacted. Under Voice, the options are VoIP, Cell, and Land Line. Under messaging the options are Email, IM, SMS, and SIP (device enabled for SIP?).

Like form 200, form 300 includes a registration submission pane 302 where the individual creates a name and password to authenticate later when browsing and subscribing to center opportunities. An action button is provided for form submission. Like the registration for a team, registration for an individual requires validation before the individual can access a center business opportunity page using the created authentication data.

Figure 4:
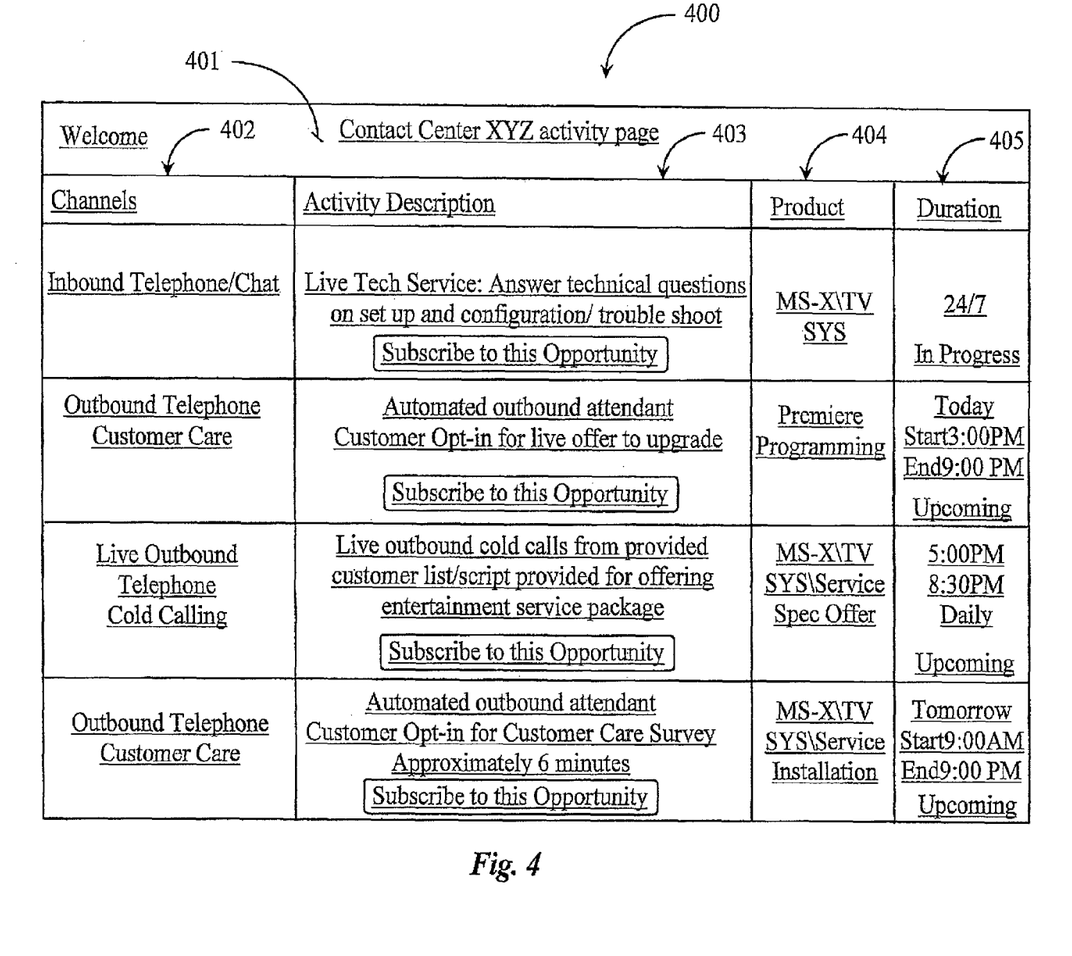
FIG. 4 is an exemplary screen shot of a secure interface for soliciting subscriber groups and individuals to perform particular contact services.

FIG. 4 is an exemplary interactive display for a secure interface 400 for soliciting subscriber groups and individuals to perform particular contact services. Interface 400 may be accessible to registered service worker groups or teams and to those registering as individuals. For groups, an administrator may be designated during the registration process and the administrator may authenticate for the group by logging into the site using the group name and password. The administrator may then browse opportunities and may subscribe to any that are of interests to the group.

For an individual, the individual may login to the site using the name and password created during registration and may browse center business opportunities and subscribe to any that are of interest. In one embodiment, several lone individuals may be dynamically selected and assembled into a group that may then be automatically validated and activated to perform a subscribed to opportunity. In this case, the selected individuals would all have qualifying skills and would all have subscribed to the same opportunity in the list of opportunities. As a group, they may be identified by a single name, given a new password, and an administrator of the group may be appointed. The administrator may be the individual possessing the most experience or skill.

One advantage the center has of being able to quickly assemble a new group from a pool of registered individuals is that the group dynamics can be created from the ground up using the skills and qualifications of the individuals. Therefore, the center can assemble or "design" a group more adaptable to a specific piece of business and may suggest or reserve the piece of business for the group as an opportunity that they may subscribe to in the future. An advantage of registering established groups is that they often have some infrastructure already in place and may be more business focused in terms of having a dedicated or semi-dedicated domain to work from.

The center operator can additionally influence the selection of business opportunities by registered individuals by adjusting the offered price for different combinations of business and worker. That is, if the center operator desires a particular group to handle some sensitive business rather than other groups when possible, it can provide a higher offer price for selecting that business to the target group than it provides for the less desirable groups. Since each group, or perhaps each individual, will be independently checking for business opportunities, the operator has in price a very flexible mechanism for further fine-tuning how work is distributed. It will be appreciated by those skilled in the art that variable price mechanisms are capable of more subtle discrimination than simple "qualified/non-qualified" selections. Furthermore, it will be appreciated by those skilled in the art that a variety of pricing mechanisms could be used in the instant invention, including but not limited to ordinary and reverse auctions, incentive pricing based on time targets, and the like.

In one embodiment, an individual may be picked up and assigned to a service worker group that has previously registered. A group may lose a skillful worker and therefore may benefit from an addition of a new team member suggested or enforced in some cases by the center. The center may require a minimum number of workers in a group to justify the effort expended in routing, bridging, and monitoring the performance of the group.

Referring now back to FIG. 4, interface 400 may be a scrollable HTML Web page containing information about current and upcoming contact center opportunities. Interface 400 has a title pane 401 that welcomes potential subscribers and identifies the source of the business opportunities as contact center XYZ. Interface 400 is divided into columns with headings and the rows describe the opportunities that may be subscribed to.

Column 402 describes the media channels used in each of the listed opportunities. Column 403 provides the opportunity description summaries for each of the opportunities listed. Column 404 defines the product and/or service involved, and column 405 defines the time, date, and duration of the opportunity. Most of the opportunities that can be subscribed to are scheduled to occur at certain times and have a definite duration. Some opportunities may be ongoing 24/7 type activities.

The first listed opportunity uses live telephone and chat channels (inbound). The work to be performed is a Live Tech Service. The job description is to answer technical questions about set-up and configuration and helping customers trouble shoot their systems. The product/Service description is the MS-X\TV SYS and the service opportunity is ongoing around the clock. An action button is provided in the listing for subscribing to the opportunity. When a group or a user subscribes to an opportunity, the system retrieves the group or individual data and makes a determination to allow the subscription or to deny the subscription.

The next opportunity available for subscription is outbound customer care. The channel is telephone. In this case, an automated system dials the customer on the telephone and gives them an option (IVR) for learning about an upgrade. The customer may select the offer and then be routed to an agent as an incoming call. In this case the service is the premier television programming package. The opportunity starts at 3:00 PM and ends at 9:00 PM Today (upcoming).

The next opportunity is a live cold calling telephone campaign from a provided customer list. Agent scripting is provided to guide the service worker in offering the customer an entertainment service package. Again the product is the MS-X\TV SYS\Service Special offer. The opportunity starts 5:00 PM and ends at 8:30 PM daily (upcoming). The next listed opportunity is an outbound customer care campaign. An automated outbound attendant calls customers and they may opt in to take a customer care survey. This opportunity estimates the time of the survey. The survey is about the customer's experience with installation of the MS-X\TV SYS\Service. The opportunity starts tomorrow at 9:00 AM and ends at 9:00 PM (upcoming).

In this example, the opportunities listed in interface 400 are presented somewhat like a television programming in a program guide. In other embodiments other presentation styles or formats may be used. In one embodiment, a group administrator may subscribe to an opportunity after the point in time that the activity associated with the opportunity has started at the contact center. The contact center may not guarantee that any subscribing group be activated during a particular activity. In one embodiment, a group of remote service workers is activated according to some development at the center which results in a need for the additional resources. In one example, agent availability becomes a factor such that when EWT for an agent exceeds a certain threshold, events are routed to activated remote groups.

In one embodiment the center accepts a subscription and honors the subscription regardless of call center conditions. In this case the center predicts when the extra resources are needed and pre-plans the estimated call workflow accordingly with a percentage of planned events going to in-house agents and a percentage reserved for the subscribing groups. In still another embodiment a contact center will have opportunities reserved only for subscribing remote service workers. There are many possibilities.

Payment amounts that the center is willing to pay service groups for each opportunity may be posted on the opportunity page and groups may see the payment data before subscribing to an opportunity. In a case where the opportunity subscription is accepted but actual conditions at the center fail to justify the use of a group, the center may pay a reservation fee to the group for its availability even though they were not activated to receive events. In this sense, subscribing groups and individuals may be considered "on call" if their subscriptions are accepted and do not conflict with other subscriptions. In these cases, the workers may be paid a minimum reservation fee for their time standing by to take events.

In some cases, customers may be charged less money to allow remote service workers to handle their business rather than in-house agents. Therefore, the actual use of remote service groups may be customer driven where groups may be activated by demand of customers who wish to pay less for service and desire shorter wait times for a live person to handle their calls.

Figure 5:
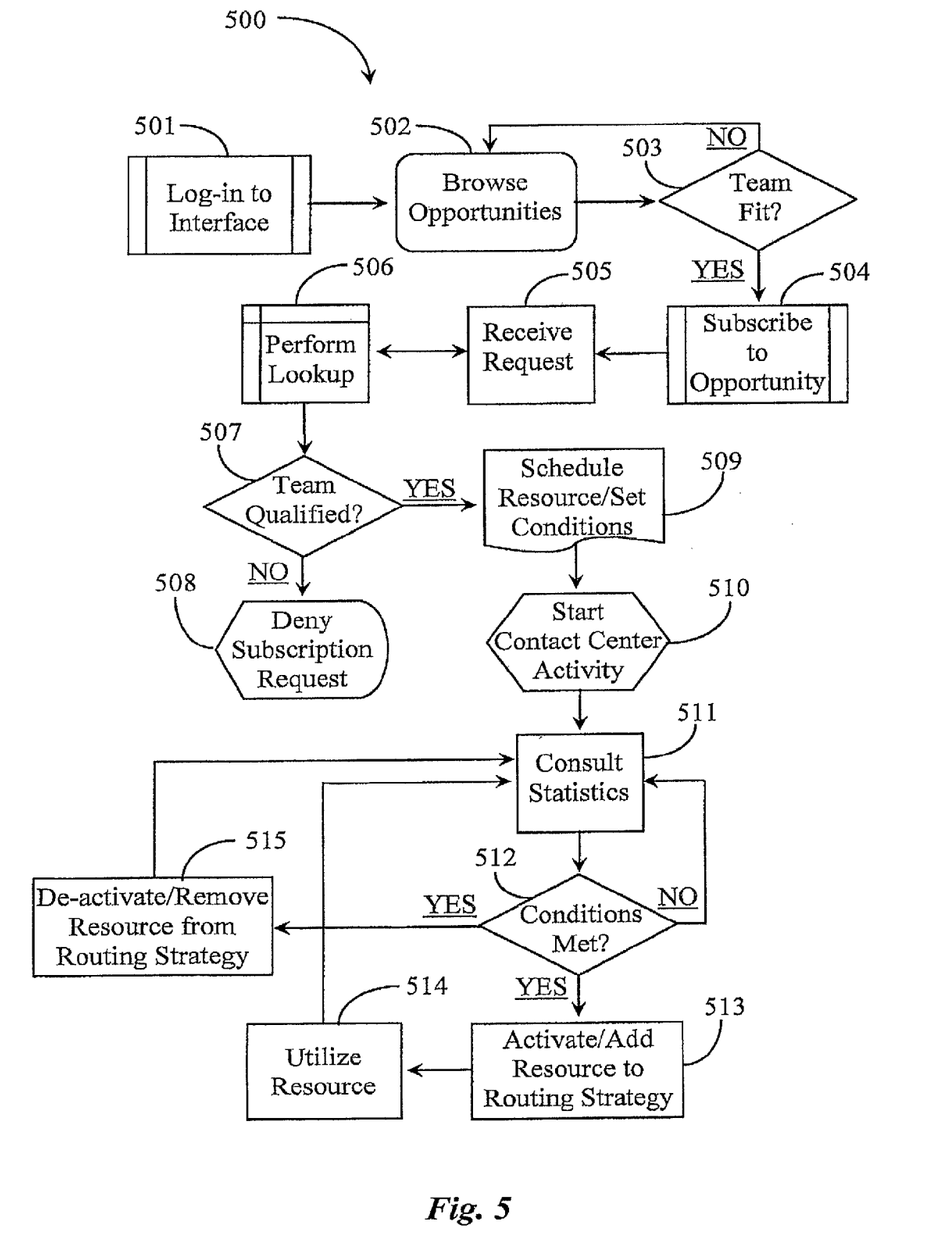
FIG. 5 is a process flow chart illustrating steps for soliciting and utilizing a remote worker group according to an embodiment of the present invention.

FIG. 5 is a process flow chart illustrating steps 500 for soliciting and utilizing a remote worker group according to an embodiment of the present invention. At step 501, a group or team administrator logs into the system interface server analogous to server 107 of FIG. 1 and accesses the business opportunity page. At step 502, the administrator browses the page for opportunities of interest that the group may wish to subscribe to.

At step 503, the administrator finds an interesting opportunity and determines if the qualifications and skills of the team fit with the qualifications and skills required of the opportunity. If at step 503, the administrator determines that the team does not fit the opportunity the process may resolve back to step 502 and the administrator may continue browsing.

At step 503, if the administrator determines that the team is a good fit to the opportunity, then at step 504 the administrator subscribes to the opportunity by activating a subscription button on the page associated with the opportunity. At step 505, the contact enter system receives the subscription request identifying the opportunity and the team subscribing to the opportunity. At step 506, the system performs a database lookup to access the team data including qualifications, skill sets, and other data. At step 507, the system determines if the team is qualified to work the opportunity. This may involve a simple comparison of skill sets against skills requirement statement associated with the opportunity.

At step 507, if the system decides that the team is not qualified to work the opportunity, then at step 508, the system may deny the subscription request and may provide a reason for the denial. At step 507, if the system determines that the team is qualified to work the opportunity, then at step 509, the system may schedule the team as a resource and set conditions on activating the team during the period of the opportunity. This step may include setting up a routing point for the team, reserving conference channels and providing team contact data to routing strategy. This step assumes that the team has subscribed before the opportunity was scheduled to begin. In one embodiment, the team may be immediately activated to service depending on conditions if the opportunity is already underway.

At step 510, the contact center activity associated with the published opportunity begins as scheduled. At step 511, statistics are consulted by routing intelligence in conjunction with the current opportunity. This step may occur periodically, before routing each event, or after routing a specified number of events. The routing intelligence is looking for certain conditions which if met require activation of the remote team of service workers standing by. At step 512 after consulting statistics if certain conditions are not met, then the process may resolve back to step 511 at the next interval. Meanwhile the team stands by waiting for activation.

At step 512, when conditions for using the team are met, then at step 513, the routing server activates or adds the team to the routing strategy according to the conditions. For example, a condition might be route every third call to group "nemesis" as long as EWT for in-house service => than 5 minutes. At step 514, the activated team is utilized by routing events to the group. The process again resolves back to step 511 for consulting statistics to determine if conditions are met for relieving the team of overflow responsibility in one example. At step 512 then the system determines if conditions are met for deactivating the team, for example, route all calls internally when EWT for in-house service <5 minutes.

If at step 512 the system determines that conditions are not back to "normal" or EWT is still =>5 minutes, then no change in routing routine occurs and every third call is still routed to the activated team. However, at step 512 if it is determined that the EWT is back to normal or EWT<5 minutes, then the team is de-activated or removed from the routing strategy in step 515. In this example, the process then resolves back to step 511 and 512 to determine if conditions have changed at the next interval. The cycle occurs periodically until the opportunity is scheduled to end. The process may change according to the type of conditions established for activating or for deactivating the team. There may be more than one team to consider. For example, one team may be brought in under one threshold and a next team if conditions continue to degenerate until all events are being handled smoothly and in a timely manner. There are a wide variety of group routing and service worker level routing strategies that might be conceived and deployed.

In another example, suppose a team is a Spanish speaking team and there are no in-house agents that speak Spanish. In this case, the condition would be is the caller speaking Spanish? If YES activate team and route to team. If the caller is speaking English, route internally. There are many different scenarios that are possible.

Figure 6:
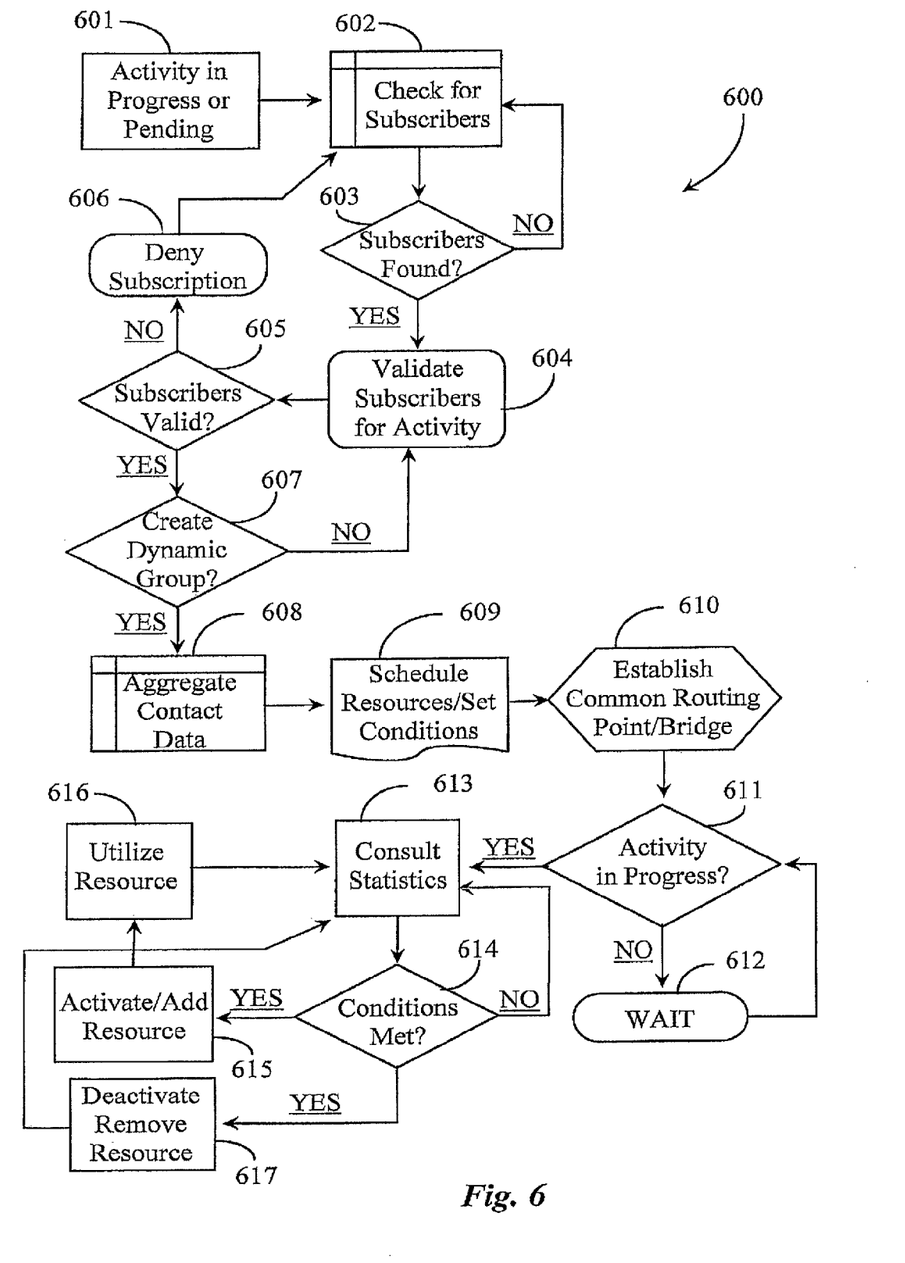
FIG. 6 is a process flow chart illustrating steps for assembling and utilizing a dynamic group of individual subscribers according to an embodiment of the present invention.

FIG. 6 is a process flow chart illustrating steps 600 for assembling and utilizing a dynamic group of individual subscribers according to an embodiment of the present invention. This process assumes that individuals register and are subsequently assembled on the fly into dynamic remote service worker groups. A step 601, an activity at the contact center is already in progress or is pending execution. At step 602, the contact center system checks for existing subscribers to the opportunity of step 601. Subscribers may have subscribed but might not have been validated as yet. Likewise, subscriber requests may be received at any time during the execution or start of the opportunity.

At step 603, the system, which may be part of a workflow allocation engine, determines if there are any subscriber requests received associated with the opportunity of step 601. If at step 603, there are no subscribers found, then the process may resolve back to step 602 until subscribers are found. It is possible that a scheduled activity associated with an opportunity begins before any subscriber requests are received by the system.

If at step 603, subscriber requests are found, then at step 604 those requests found are validated in terms of qualifications and skill set required to work the opportunity. This step may involve accessing subscriber registration data and comparing individual subscriber skill sets and other qualifications against the requirements of the opportunity. At step 605, the system makes a determination if the subscribers found are valid. This may be a batch process as more than one individual may be required by the system to form a group. At step 606, any subscribers that are determined not to be qualified to work the opportunity of step 601 have their subscription requests denied at step 606. The process may resolve from step 606 back to step 602 to check for more subscriber requests.

At step 605, if the system determines there are valid subscribers to the opportunity of step 601, at step 607, the system may determine if there are enough valid subscribers to form a dynamic group of service workers. If at step 607, the system determines not to form a group the process may resolve back to step 604 to validate a next batch of subscribers and to step 605 to determine if there are any new valid subscribers to add to the current batch of subscribers.

If at step 607, the system determines that there are enough subscribers to form a dynamic group, then at step 608 the system aggregates the subscribers' contact data and a dynamic group is created. In this step, the group may be given a name and a group administrator may be appointed in case the group will survive the current opportunity to subscribe to further business as a qualified group. Steps 602 through 608 may be repeated a number of times resulting in more than one group created for a same opportunity in progress or pending execution.

At step 609, the system schedules the group resources and may set conditions for activation of those resources. At this point in the process, as a group is created, it may be scheduled for use. Each member or individual of the group may receive notification that their subscriptions were accepted and that they are assigned to group to work the opportunity. Each member then is standing by as a group member while set-up continues.

At step 610, the system may establish a common routing point or bridge for the group to use when activated. At step 611, the system determines if the activity of step 601 is in progress yet or is still pending. At step 611, if the activity associated with the opportunity has not been started then the system may wait at step 612 and recheck again back at step 611. I the meantime more subscriptions can be received for the opportunity and more groups may be dynamically created and set up to work the opportunity.

In actual practice as many groups may be assembled as needed to work an opportunity provided that enough subscription requests are received and validated by the system. The rest of the process steps after the group is assembled and set up are similar to steps 511-515 described above. At step 611, if the system determines that the activity associated with the opportunity of step 601 is in progress, then at step 613, the routing system may consult statistics to determine if conditions warrant activation of one or more dynamically created groups that are set up and standing by groups.

Prior to activation, individuals in a group may receive a telephone number to a conference bridge, or a web link to a virtual routing point and may be instructed to log into the respective bridge or routing point to receive events in a way that monitoring may be performed by the system. If each individual received a call center application at the time of registration, they may be able to monitor some of their own activity using the application to monitor communication for example, the application reporting periodically to the contact center through an online server like Web server 107 described in FIG. 1.

At step 614, if conditions are met for activating a group, then at step 615, a group is activated or added as a resource for routing according to the conditions. At step 616, the activated group is utilized to work the opportunity according to the conditions of activation. If, at step 614, the conditions are not met for group activation, then the process resolves back to step 613 as a next consultation interval.

After step 616, the process resolves back to step 613 to see if conditions have changed, if not, the process loops again back to step 613 in the meantime the group remains activated and is working the opportunity. At step 614 if conditions change and conditions are met for deactivating the group, then at step 617, the group is deactivated or removed as a resource from routing strategy.

It will be apparent to one with skill in the art that more than one group may be simultaneously activated and working an opportunity under various routing strategies. For example, in one routing strategy 50% of all calls in queue are routed internally and the remaining calls are distributed evenly among multiple activated groups. Group hierarchies might be observed where a first group is activated and has priority overflow then a second group is brought in only when the in-house agents and the first group are busy with calls.

In one embodiment of the invention different groups may be activated to handle different portions of a customer service chain managed from one location. For example, one opportunity might be cold calling to set leads while another separate opportunity might involve calling the leads and finishing the business.

The system of the present invention may be practiced over the Internet and telephone networks and may be practiced seamlessly between Web services, digital and analog voice services. In one embodiment, remote service worker opportunities are competed for by highly qualified groups. Those groups may be monitored for performance factors and over time may rise or fall off in competiveness compared with other groups for coveted opportunities.

It will be apparent to one with skill in the art that the remote service worker engagement system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system configured to solicit and activate one or more groups of one or more groups of workers to service contact center business of a contact center, the system comprising:
   an interface configured to be accessed by the one or more groups of workers for providing registration data for subscribing the one or more groups of workers to service communication events received at the contact center;
   a data repository configured to store the registration data for the subscribed one or more groups of workers; and
   a server configured to activate one or more groups of the subscribed one or more groups of workers according to the communication events received at the contact center, and to route the communication events to the activated one or more groups, based on a routing strategy, to perform services according to the communication events.

2. The system of claim 1, wherein the communication events are associated with one or more enterprises.

3. The system of claim 1, wherein the activated one or more groups are deactivated after performance of services.

4. The system of claim 1, wherein the registration data comprises current skills qualification data of the subscribed one or more groups of workers.

5. The system of claim 1, wherein the registration data further comprises available channels through which the subscribed one or more groups of workers may be contacted, the available channels comprising Voice over internet protocol (VOIP), telephone, email, instant message (IM), short message service (SMS), and session initiation protocol (SIP).

6. The system of claim 1, wherein the server is further configured to validate some or all of the registration data.

7. The system of claim 1, wherein the server is further configured to activate the one or more groups when one or more conditions are met, the one or more conditions comprising availability of agents falling below a threshold.

8. The system of claim 1, wherein the server is further configured to activate the one or more groups when the one or more groups are qualified to perform the services according to the communication event.

9. The system of claim 1, wherein the server is further configured to monitor performance of the service by the activated one or more groups by providing a telephone number to a conference bridge or a web link to a virtual routing point to the activated one or more groups prior to activation.

10. A system configured to assemble a virtual service group from a plurality of service workers and to activate the virtual service group for servicing contact center business of a contact center, the system comprising:
    an interface configured to be accessed by the plurality of service workers to subscribe to receive service communication events received at the contact center, the communication events relating to the contact center business;
    a data repository configured to store information about the subscribed ones of the plurality of the service workers; and
    a server configured to assemble, based on the stored information, a virtual service group comprising one or more of the subscribed ones of the plurality of the service workers subscribed to receive communication events relating to a same piece of contact center business, the server being further configured to aggregate subscription information of the assembled virtual service group for routing the service communication events to the assembled virtual service group.

11. The system of claim 10, wherein the information comprises current skills qualification data of the subscribed ones of the plurality of the service workers.

12. The system of claim 10, wherein the virtual service group is dynamically assembled from among the subscribed ones of the plurality of the service workers based on the information.

13. The system of claim 10, wherein the server is further configured to activate the assembled virtual service group when one or more conditions are met, the one or more conditions comprising availability of agents falling below a threshold.

14. A method for acquisitioning a plurality of contact center resources for servicing service opportunities of the contact center, the method comprising:
    accepting, by a processor, subscription requests from a plurality of potential contact center resources and presenting for subscription one or more service opportunities to the plurality of potential contact center resources;
    receiving and validating, by the processor, the subscription requests relative to the one or more service opportunities to obtain a plurality of validated subscribers from among the plurality of potential contact center resources;
    reserving, by the processor, the plurality of validated subscribers for potential activation during occurrence of the one or more service opportunities; and
    activating, by the processor, the plurality of validated subscribers to perform services according to the service opportunities, the services comprising servicing communication events routed to the plurality of validated subscribers from the contact center.

15. The method of claim 14, wherein the activating the plurality of validated subscribers comprises determining if one or more conditions are met, the one or more conditions comprising availability of agents falling below a threshold.

16. The method of claim 14, wherein the activating the plurality of validated subscribers comprises determining if the plurality of validated subscribers are qualified to perform the services according to the communication events.

17. The method of claim 14, further comprising monitoring, by the processor, performance of the service by the plurality of validated subscribers by providing a telephone number to a conference bridge or a web link to a virtual routing point to the plurality of validated subscribers prior to activation.

* * * * *